United States Patent [19]

Alinari

[11] 4,114,458
[45] Sep. 19, 1978

[54] FLUID PRESSURE TRANSDUCER AND PRESSURE MEASURING INSTRUMENT INCLUDING THE TRANSDUCER

[76] Inventor: Carlo Alinari, Corso Vittorio Emanuele 200, Turin, Italy

[21] Appl. No.: 810,830

[22] Filed: Jun. 28, 1977

[30] Foreign Application Priority Data

Jul. 2, 1976 [IT] Italy .............................. 68644 A/76

[51] Int. Cl.² .......................... G01L 7/06; G01L 7/10
[52] U.S. Cl. .................................................... 73/729
[58] Field of Search .................. 73/410, 146.8, 300, 73/409, 4 R, 729, 731; 92/34, 41

[56] References Cited

U.S. PATENT DOCUMENTS

| | | | |
|---|---|---|---|
| 2,689,481 | 9/1954 | Quiat | 73/146.8 |
| 2,770,134 | 11/1956 | Galperin | 73/146.8 |
| 3,777,573 | 12/1973 | Alinari | 73/300 |
| 3,908,461 | 9/1975 | Turpen | 73/410 |

*Primary Examiner*—Donald O. Woodiel
*Attorney, Agent, or Firm*—Sughrue, Rothwell, Mion, Zinn and Macpeak

[57] ABSTRACT

A fluid pressure transducer has a sealed capsule with a thin bellows wall of flexible plastics material and rigid end walls attached to a support and to an indicator respectively, so that longitudinal expansion and contraction of the capsule due to variation of the pressure of the fluid in which the capsule is immersed give an indication of this pressure. The capsule contains a gas which imparts an effective elasticity to the capsule, the elasticity of the bellows wall itself being negligible, so that the length of the capsule is to a close approximation inversely proportional to the applied pressure. For direct pressure measurement the floating end of the capsule may carry an indicator which is visible through a wall of a rigid capsule-enclosing casing to which the pressure to be measured is applied. An instrument for use as a depth gauge may incorporate the transducer, which for this application may include a calibrated flow restrictor through which fluid pressure is applied to the capsule, such that the consequent delay in the depth reading provided by the transducer indicates to a diver the length of successive decompression stops during an ascent from depth.

35 Claims, 11 Drawing Figures

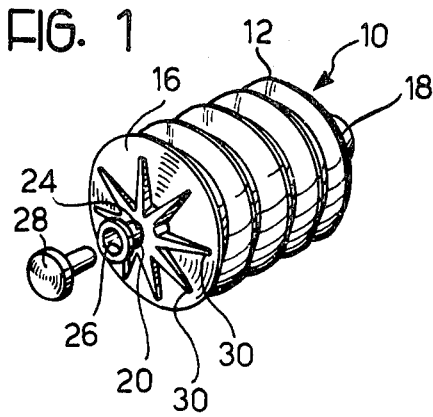
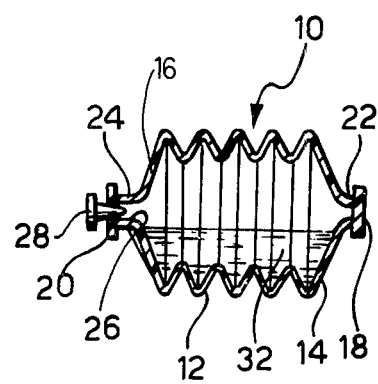
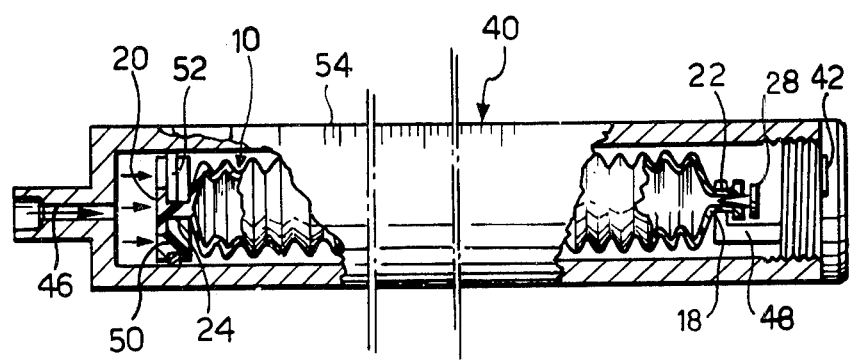
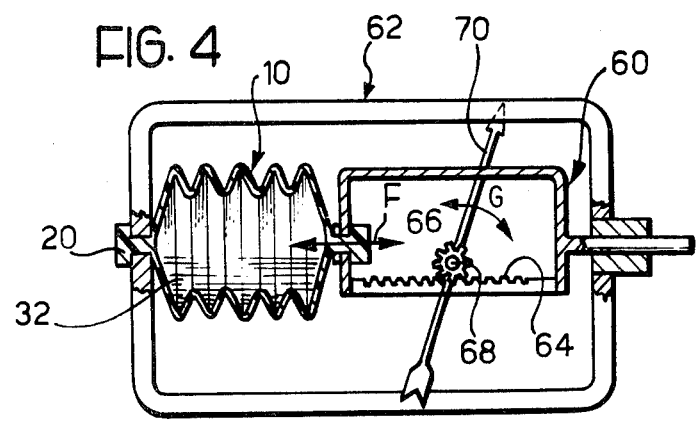

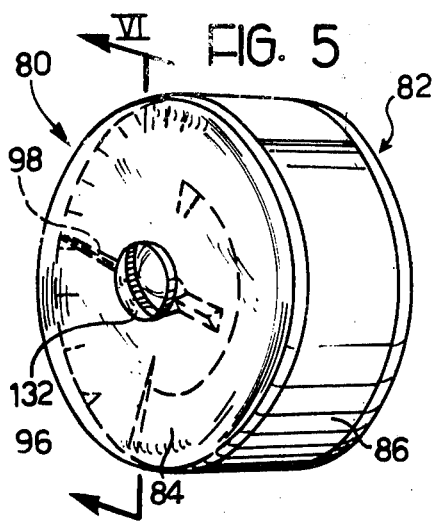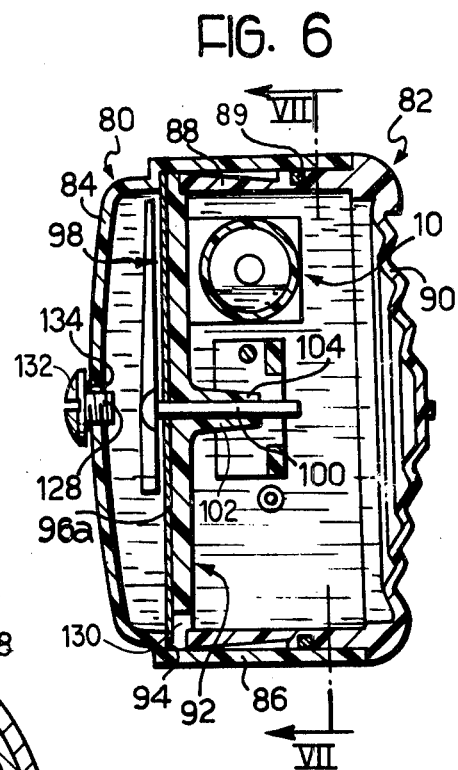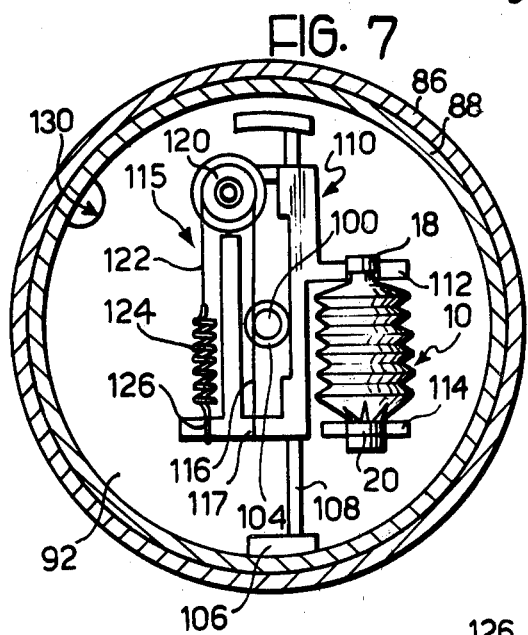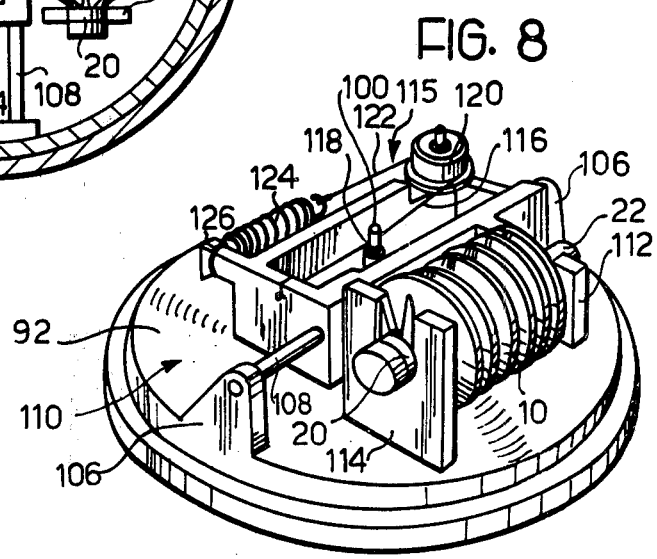

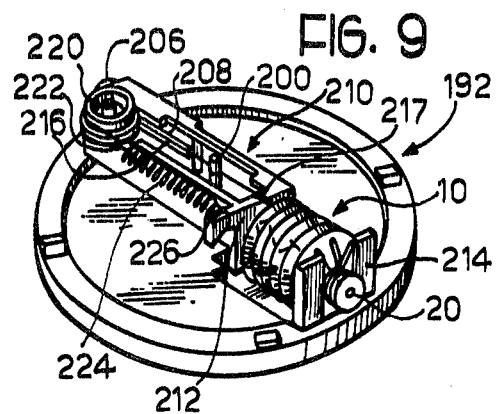
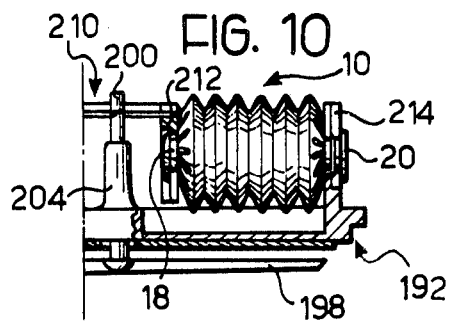
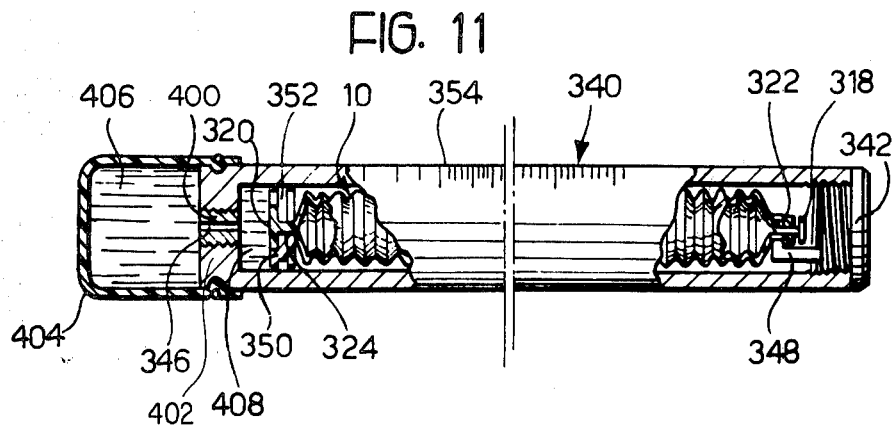

FLUID PRESSURE TRANSDUCER AND PRESSURE MEASURING INSTRUMENT INCLUDING THE TRANSDUCER

The present invention concerns fluid pressure transducers.

More particularly, the invention relates to pressure transducers of the type comprising a watertight capsule having a peripheral bellows wall and a pair of opposite end walls one of which is provided with means for attachment to a support and the other of which is provided with means for direct or indirect connection to an indicator device responsive to longitudinal expansion and contraction of the capsule due to variations in the pressure of the fluid environment in which the capsule is immersed, to afford an indication of said pressure.

In various types of instruments for the measurement of fluid pressures, transducers of the aforesaid type having metal capsules are known and widely used. Generally these capsules are evacuated, the pressure to be measured acting upon the outside of the capsule and tending to compress the latter axially against an elastic force which may be provided by a spring, generally arranged coaxially in the capsule itself, or by the inherent elasticity of the metal capsule.

Such metal capsules are rather costly and their use is not justified in inexpensive pressure measuring instruments.

The main object of the present invention is to provide a transducer having a capsule with a bellows configuration as aforesaid which is cheap to produce and which can be incorporated in inexpensive pressure measuring instruments which perform with reasonable accuracy.

According to the present invention there is provided a transducer of the type referred to, characterised in that the capsule has a thin bellows wall of flexible plastics material and contains a gas, such as air, the elasticity of the bellows wall being negligible compared with that of the gas contained within the capsule.

In a transducer according to the invention, the capsule of which can advantageously be produced by the blow moulding of a cheap plastics material, such as polyethylene, the elastic force which opposes axial compression of the capsule is provided by the gas contained in the capsule. According to Boyle's law, the product of the pressure $p$ and the volume $v$ of a given mass of gas is constant to a good approximation. Boyle's law is valid only for a constant temperature, but for an instrument intended for use in normal environmental temperatures, the effect of changes in ambient temperature may be deemed to be negligible. It is, therefore, possible to produce an instrument calibrated with reasonable accuracy for use in normal environmental temperatures.

A transducer according to the invention, compared with a transducer having a metal bellows, has the advantage of being substantially free of hysteresis, inasmuch as the elasticity or return force is provided by the compressibility of the gas within the capsule and is not dependent upon the elasticity of the capsule walls. This factor also contributes to good accuracy.

The capsule according to the invention may be partly filled with gas and may also contain an incompressible liquid which is substantially immiscible with this gas. Amongst the liquids which satisfy these requirements are mercury and mineral oils. This enables the calibration of the instrument for which the transducer is intended to be carried out before the latter is installed in the instrument itself, by simply introducing into the capsule a predetermined quantity of the liquid, before sealing the capsule. The greater the proportion of liquid contained in the capsule the more 'rigid' the capsule will be, for a given internal volume of the capsule in its rest condition.

In order that the variation in volume of the gas in the capsule in response to external pressure variation should translate itself, as far as possible, into a purely axial deformation of the capsule, the capsule end walls are preferably very rigid. For this purpose, these end walls may be formed with radial stiffening ribs.

The invention also comprehends instruments for the measurement of fluid pressure, such as pressure gauges, depth gauges, decompression gauges and the like, characterised by the fact that they incorporate a transducer in accordance with the invention.

The invention will be more clearly understood from the following detailed description, given by way of non-limiting example, with reference to the accompanying drawings, in which:

FIG. 1 is a perspective view of a pressure transducer according to one embodiment of the invention;

FIG. 2 is an axial section of the transducer shown in FIG. 1;

FIG. 3 is a diagrammatic side view, partly cut away in section, of a pressure gauge according to the invention for the measurement of tyre pressures;

FIG. 4 is a diagrammatic axial section of the essential parts of an instrument for measuring pressures of the type affording an amplified pressure reading, according to another embodiment of the invention;

FIG. 5 is an external perspective view of a depth gauge in accordance with another embodiment of the invention;

FIG. 6 is a diametral section taken along the line VI—VI of FIG. 5 which illustrates the internal disposition of the depth gauge;

FIG. 7 is a cross section of the same depth gauge, taken along the line VII—VII of FIG. 6;

FIG. 8 is a perspective view of the same parts of the depth gauge shown in FIG. 7;

FIG. 9 is a perspective view of the internal parts of a depth gauge according to a variant of the invention;

FIG. 10 is a view in elevation, fragmentary and partly sectioned, of internal parts of the depth gauge of FIG. 8, and FIG. 11 is a diagrammatic side view, partially cut away in section, of a decompression gauge according to yet another embodiment of the invention.

With reference to FIGS. 1 and 2, a pressure transducer according to the invention comprises a watertight capsule, indicated generally by 10, which is made of plastics material, such as, for example, polyethylene. The capsule 10 is essentially formed of a peripheral bellows wall 12 and of a pair of opposite end walls 14 and 16. These two end walls are provided with respective necks 18 and 20 which project axially from the centres of the bottoms themselves. Each of these necks 18, 20 has an external peripheral groove, 22, 24, respectively. As will be seen more clearly later on, the two necks 18 and 20 serve to anchor one of the end walls to a support and to connect the other end wall directly or indirectly to a pointer, or like indicator element, to transmit to the latter an indication of the axial contraction and expansion movements of the capsule 10 due to variations in the pressure of the fluid in which the capsule itself is immersed.

In the form of embodiment shown in FIGS. 1 and 2, the neck 20 has an axial through hole 26. Because the capsule 10 is advantageously obtained by the blow-moulding of an unfinished hollow body of polyethylene or other plastics material in a suitably shaped mould, the hole 26 may conveniently be the penetration orifice of the blow-moulding nozzle. In order to render the capsule 10 usable as a transducer, it is necessary that it should be watertight, and for which purpose the hole 26 is hermetically sealed. In contrast to traditional metal bellows capsules, before sealing the hole 26 in the capsule 10 no internal vacuum is created. In general, therefore, the hole 26 is sealed while the capsule 10 is in its rest condition, with its bellows wall 12 having the configuration with which it has been moulded, filled with air (or another gas) at atmospheric pressure.

It would be possible to introduce air or gas into the capsule 10 at a super-atmospheric pressure before the capsule is hermetically sealed.

The hole 26 can be sealed hermetically by heat welding, but the preferred method of sealing is by the insertion into this hole of a plug 28 of the type having a cone-shaped stem. The fluid-tightness achieved by a sealing plug of this kind is maintained during the use of the capsule 10 as a transducer inasmuch as this is intended for the measurement of positive pressures, greater than that within the capsule 10, so that the plug 28 tends to be urged further into the hole 26.

In use, as has been stated in the introduction, because of the flexible bellows wall 12, the gas contained in the capsule 10 behaves substantially according to Boyle's law, that is to say its volume varies substantially in inverse proportion to the pressure. A substantially linear relation between the volume and the pressure is ensured by the small thickness of the bellows wall 12 - the thinner the wall 12 the less significant is the elasticity of the wall 12 compared with that of the gas enclosed in the capsule. For a polyethylene capsule having a mean diameter of the bellows wall 12 of the order of 10-15 mm, a suitable wall thickness is of the order of 0.1 - 0.2 mm.

As a result of its bellows wall configuration the capsule 10 exhibits a variation in volume which is represented essentially by a variation of the axial length of the capsule 10 between the two necks 18 and 20, that is, the length of the capsule 10 is inversely proportional to the pressure. In order to approximate to such inverse proportionality as closely as possible the two end walls 14 and 16 of the capsule 10 should be formed with a high degree of rigidity when the capsule is being blow-moulded. For this purpose the end walls 14 and 16 are formed with radial stiffening ribs 30.

In order to calibrate the capsule 10, that is, to obtain a desired proportionality between the length of the capsule and the external pressure applied to it, a predetermined volume of an incompressible liquid is introduced through the hole 26 before the latter is sealed by means of heat welding or by means of the plug 28. The incompressible liquid should as far as possible be immiscible with air or any other gas. This liquid, indicated by 32 in FIG. 2, may for example comprise mercury or a mineral oil. The sealing of the hole 26 by means of a removable plug such as the plug 28 is advantageous not only because it permits the introduction of the liquid 32, but also the subsequent extraction of all or part of the liquid for the purpose of a subsequent re-calibration or a correction of an earlier calibration.

FIG. 3 shows an instrument of simple design which can be used advantageously for the measurement of tyre pressures. This instrument comprises a rigid tubular casing 40 one end of which is sealed by a screw cap 42 while its other end has a tubular connector 44 communicating with the interior of the casing 40 through a port 46. The connector 44 is adapted to connect the inside of the casing 40 with an environment the pressure of which is to be measured. For the measurement of a tyre pressure the connector 44 may, for example, be connectible to an air valve.

Inside the casing 40 there is disposed a capsule 10 according to the invention which extends over a substantial part of the length of the casing 10. The two necks 18 and 20 of the capsule 10 are of the type illustrated in FIG. 2 and have respective peripheral grooves 22 and 24. A bifurcated support 48 or like support element integral with the cap engages in the groove 22 of the neck 18. A split washer 50 is engaged in the groove 24 of the neck 20 and has on its periphery a line or other indicator 52 which acts as a pointer. At least one part of the cylindrical wall of the casing 40 is transparent and is provided with a scale 54 graduated, for example, in $Kg/cm^2$.

The pressure applied through the port 46 to the casing 40 acts on the capsule 10 causing it to contract longitudinally, with consequent displacement of the indicator 52 along the scale 54. If the capsule 10 has been correctly calibrated as described earlier the value of pressure can be read on the scale 54 with sufficient accuracy for the purpose for which a pressure gauge such as that of FIG. 3 is intended, in this case the checking of the tyre pressures.

FIG. 4 illustrates diagrammatically an instrument for the measurement of pressures, with an amplified pressure reading. A capsule 10, such as that of FIGS. 1 and 2, is calibrated by the insertion therein of a predetermined volume of liquid 32 as described earlier. Of the two necks 18, 20 neck 18 of the capsule 10 is connected to a small movable frame 60, whilst the other neck 20 is fixed to an external fixed support, indicated generally by 62. The frame 60 is guided for sliding movement in the support 62 in the direction of the longitudinal axis of the capsule 10, that is, in the direction indicated by the double-headed arrow F. The frame 60 is provided with a rack 64 which extends parallel to the direction F and which meshes with a toothed pinion 66 keyed on a spindle 68 which is rotatably mounted in the support 62. The spindle 68 also carries an indicator in the form of a pointer 70 which is movable angularly in front of a dial (not shown) bearing a scale graduated with the required units of measurement.

The support 62 and its associated parts can be enclosed in a casing, or can itself be in the form of an hermetically sealed casing, provided with means of communication, for example, a tubular connection, with an environment the pressure of which is to be measured.

In use of the instrument of FIG. 4, axial movements of the neck 18 of the capsule 10 in the direction of the arrow F, resulting from variations in the pressure applied to the capsule, are translated into corresponding angular movements of the pointer 70, as indicated by the double-headed arrow G. By suitably selecting the gear ratio of the rack 64 and pinion 66, it is possible to arrange that the angular movements of the pointer 70 represent a required amplification of the axial movements of the neck 18.

FIGS. 5 to 8 represent a depth gauge embodying the invention. The depth gauge has a shallow substantially cylindrical fluid-tight casing formed in two parts 80 and 82. The casing part 80 is made of a rigid transparent plastics material with a domed front wall 84 and a substantially cylindrical skirt 86. The other casing part 82 is made of a flexible plastics material and has a substantially cylindrical skirt 88 which fits within the skirt 86 and is sealed to the latter by means of a sealing ring 89, and a convex circular rear wall 90 formed with concentric corrugations. The wall 90 forms, as will be seen, a flexible membrane by means of which the pressure prevailing outside the casing is transmitted to the interior of the said casing. Within the casing 80, 82 there is mounted a circular plate 92, which is held in position by the clamping of its outer edge between the edge 93 of the skirt 88 of the casing part 82 and an annular internal shoulder 94 situated in the transition zone between the front wall 84 and the skirt 86 of the casing part 80. The front face of the circular plate 92, that is, the face turned towards the transparent front wall 84, carries a depth scale 96 graduated, for example, in meters of water, and shown in broken outline in FIG. 5.

In front of the scale 96 there is located a movable indicator formed by pointer 98 which is attached to a spindle 100 rotatably mounted in a central bore 102 extending through the plate 92 and through a rear tubular appendix 104 formed integrally with the plate 92. The spindle 100 is of such a length that it projects rearwardly beyond the appendix 104 towards the rear wall 90.

On the rear face of the plate 92, facing towards the rear wall 90, there are two diametrically opposite upstanding ears 106 which support a metal rod 108 acting as a rectilinear guide and extending diametrically across the plate 92.

A cursor 110, advantageously in the form of a small frame of plastics material, is slidably mounted on the guide rod 108. The cursor frame 110 has a laterally outwardly projecting forked lug 112. A fixed lug 114 having a forked end projects from the rear face of the plate 92 and is spaced from the lug 112, the two lugs 112, 114 serving as anchorages for the necks 18 and 20 respectively of a pressure transducer capsule 10 such as that of FIGS. 1 and 2. The arrangement is such that the longitudinal axis of the capsule 10 is parallel to the direction of sliding movement of the cursor frame 110, defined by the axis of the guide rod 108.

Advantageously, the circular plate 92 and its forked lug 114 are formed in one piece of moulded plastics material. Similarly, the pointer 98 and its spindle 100 may be moulded in a single piece of plastics material. The graduated scale 96 can be directly inscribed on the front face of the plate 92, or on a dial plate 96a formed, for example, of metal, seated on this front face.

The cursor frame 110 is connected to the spindle 100 by means of a drive transmission which serves to transform the linear movements of the cursor frame 110 into corresponding angular movements of the spindle 100 and, therefore, of the pointer 98. Advantageously this transmission comprises a thin thread 115 of polyamide material, which is formed into a U-shaped loop on the cursor frame 110 with one portion 116 of the loop parallel to the direction of sliding movement defined by the guide rod 108, which is also parallel to the longitudinal axis of the capsule 10. The end of the thread 115 in the portion 116 is fixed in a notch 117 of the cursor frame 110 and the portion 116 includes a single turn 118 wound around the spindle 100. The thread then continues with a loop around a small pulley 120 rotatably mounted on the cursor frame 110 at the opposite end of the portion 116 from the anchoring notch 117. A second portion 122 of the thread 115 proceeds from the pulley 120 parallel to the portion 116, the portion 122 being anchored to one end of a helical tension spring 124 the other end of which is anchored at 126 to the same end of the cursor frame 110 as that to which the thread portion 116 is anchored. As will be understood, the spring 124 serves simply to keep the turn 118 tightened around the spindle 100 and does not exert a return force on the cursor frame 110.

The casing formed by the two parts 80 and 82 is completely filled with oil or a like liquid in which the capsule 10 and all the other parts contained within the casing are immersed. The filling of the casing with oil or other liquid is effected, after the mounting of the assembly, through a threaded hole 128 which is provided in the centre of the front wall 84. The passage of the liquid from one side to the other of the plate 92 is made possible by a notch 130 in the edge of the plate 92, the filled casing being sealed by means of a screw plug 132 provided with an annular sealing washer 134.

In use of the depth gauge, the water pressure prevailing on the outside of the casing 80, 82 is communicated by means of the flexible wall 90 to the oil or other liquid contained within the casing. The pressure of this liquid in turn acts upon the capsule 10, and the resultant displacement of the neck 18 causes a corresponding linear displacement of the cursor frame 110 which, through the thread 115, causes a corresponding angular displacement of the pointer 98.

A depth gauge such as that illustrated in FIGS. 5 to 8 can be produced in a very compact form, with a casing diameter of the order of 5–6 cm. Such a compact form is made possible by the juxtapostion of the cursor frame 110 and the capsule 10. Furthermore, since most of the parts can be moulded in plastics material, a depth gauge according to FIGS. 5 to 8 can be produced at very low cost.

A pressure transducer according to the invention with a capsule 10 having a diameter of 13 mm and a length, measured between the grooves 22 and 24 of the necks 18 and 20, of 16 mm in the uncompressed state, allows the measurement of depths of from 0 to 70 meters with a rotation of the pointer 98 of about one and a half revolutions. Tests have shown that the error of such an instrument did not exceed ± 3%: an error of this order is entirely acceptable for the purpose of ensuring the safety of a diver, particularly with regard to the decompression pauses which he must observe at various depths when returning to the surface.

FIGS. 9 and 10 show a variant of the depth gauge illustrated in FIGS. 6 to 8. The parts of the FIGS. 9 and 10 which are identical or similar to those of FIGS. 6 to 8 have been indicated by the same reference numerals, increased by 100 (except the capsule 10 and its parts). The variant of FIGS. 9 and 10 will be described only as regards those parts which differ from those shown in FIGS. 6 to 8.

In FIGS. 9 and 10 the plate 192 carries only one lug 206 to which a guide rod 208 is fixed, extending cantilever fashion towards the centre of the plate 192. The guide rod 208, unlike the rod 108, extends over part only of the diameter of the plate 192. On the guide rod 208 there is slidingly mounted a cursor frame 210 which is connected to the spindle 200 of the pointer 198 in the same manner as in the embodiment of FIGS. 5 to 8.

The capsule 10, identical to that of the embodiment of FIGS. 5 to 8, is aligned with the cursor frame 210 in the diametral direction of the plate 192. The neck 18 of the capsule 10 is seated in a fork 212 provided at the adjacent end of the cursor frame 210 and forming part of the latter. The other neck 20 of the capsule 10 is anchored in a forked lug 214 situated on the edge of the plate 192 and formed integrally with the latter.

The arrangement of FIGS. 9 and 10 is advantageous, compared with that of FIGS. 6 to 8, inasmuch as the capsule 10 is aligned with the cursor frame 210 on an axis which passes through or close to the spindle 200. Consequently, the cursor frame 210 itself is not subject to substantial torque which could cause excessive friction between the cursor frame 210 and the guide rod 208. The instrument of FIGS. 9 and 10 for this reason possesses less hysteresis than the instrument of FIGS. 6 to 8.

It will be understood that the invention is not limited to the embodiments which have been described and illustrated only by way of example. For example, the sealable hole for filling the capsule 10 can be provided in one of the end walls in a part other than the centre of the associated neck, although this central disposition of the filling hole is the most practical. Similarly, an arrangement as illustrated in FIGS. 6 to 8 or 9 and 10 could be adopted for a pressure gauge as well as for the depth gauges illustrated, in which case the rear wall 90 would be rigid, and the casing of the instrument would instead have a connector enabling the interior of the casing to be placed in communication with a fluid environment the pressure of which is to be measured. Furthermore, in a depth gauge or other instrument of the type illustrated in FIGS. 5 to 8, other forms of drive transmission than the illustrated thread transmission could be employed, such as a rack and pinion transmission, as illustrated in FIG. 4; also, the transmission thread 115 could follow a path other than a U path, including a rectilinear path, provided an elastic tensioning element acts on one of the ends of the thread.

FIG. 11 shows an embodiment of an instrument according to the invention suitable for use as a decompression gauge, that is, an instrument which indicates to a diver the duration and the number of the decompression pauses which the diver must observe when returning to the surface.

The instrument illustrated in FIG. 11 is similar to the pressure gauge illustrated in FIG. 3 and parts which are identical or similar to those shown in FIG. 3 have been indicated by the same reference numerals, increased by 300, with the exception of the capsule 10.

In the embodiment of FIG. 11, the port 46 of FIG. 3 is replaced by a calibrated restrictor orifice 346 formed in a screw-threaded insert 400, which may be replaced or interchanged, which is screwed into an end wall 402 of the rigid tubular casing 340. A flexible hood 404 is fitted over and sealed to the end wall 402, the hood 404 being made of rubber or flexible plastics material. The instrument therefore has two interconnected chambers, specifically a deformable chamber 406 defined within the flexible hood 404, and a variable volume chamber 408 defined within the rigid casing 340 externally of the capsule 10. The two chambers are in permanent communication with each other through the orifice 346.

The orifice 46 restricts the flow of fluid pressure from chamber 406 to chamber 408.

By way of example the space defined by the chamber 406, the orifice 346 and the chamber 408 is completely filled with a mineral oil.

When the instrument of FIG. 11 is immersed in water the external hydrostatic pressure compresses the deformable chamber 406 formed by the flexible hood 404 and forces liquid from the chamber 406, through the restrictor orifice 346, into the chamber 408, overcoming the flow resistance presented by the orifice 346. Gradually, as the liquid passes into the chamber 408, the capsule 10 is compressed and the indicator 352 is displaced (towards the right in FIG. 11) along the scale 354.

The scale 354 is in this case suitably graduated so as to show the levels at which decompression pauses are to be observed by the diver, that is, the successive levels at which the diver must rest during an ascent to the surface in order to avoid embolism or "the bends". As the diver returns to the surface, the static pressure acting on the casing 404 decreases and the capsule 10, in expanding, slowly returns liquid from the chamber 408 to the chamber 406, the indicator 352 moving in a direction contrary to that referred to earlier, that is, towards the left in FIG. 11, along the scale 354. This displacement follows the falling external hydrostatic pressure with a delay which is determined by the restrictor orifice 346. When the diver, in returning to the surface, reaches a predetermined level indicated by his depth gauge, he pauses at this level until the pressures in the two chambers 406 and 408 are balanced. This balanced condition is indicated by the pointer 352, which comes to rest in correspondence with the mark on the graduated scale 354 corresponding to the level indicated by the depth gauge.

The calibration of the restrictor orifice 346 must be such that the interval of time required to reach balancing of pressures in the chambers 406 and 408 corresponds to the dwell time for which a diver must pause at each successive level to eliminate nitrogen from his body tissue in question and thereby avoid embolism.

I claim:

1. A pressure transducer for fluids, of the type comprising a watertight capsule which in use of the transducer is surrounded by fluid, said capsule having a peripheral bellows wall and a pair of opposite end walls, means for the attachment of one end wall to a support, an indicator device, and means for the connection of the other end wall to said indicator device, which provides an indication of changes in length of the capsule resulting from variations in the pressure of said fluid surrounding the capsule to afford an indication of said pressure, wherein the improvement consists in the capsule having a thin below wall of flexible plastics material, which capsule is partly filled with gas such as air and also contains an incompressible liquid which is substantially immiscible with said gas, the elasticity of said bellows wall being negligible compared with that of the gas contained within the capsule.

2. A transducer as defined in claim 1, wherein the said liquid is selected from mercury and mineral oils.

3. A transducer according to claim 1, including means defining a hole in one of the end walls of the capsule for the introduction and/or removal of liquid, and a removable plug inserted in said hole.

4. A transducer as defined in claim 3, wherein the hole for the introduction and/or the removal of the liquid is an axial hole extending through the said neck.

5. A transducer as defined in claim 1, wherein the means for attachment to the support comprise a neck projecting axially from the center of the respective end wall of the capsule, said neck having a peripheral groove, and a cooperating forked lug forming part of the support and engaging said neck.

6. A transducer as defined in claim 1, wherein the means for connection to the pressure indicator device comprise a neck projecting axially from the center of the respective end wall of the capsule, said neck having a peripheral groove, and a forked part connected to said indicator device and engaging said neck.

7. A transducer as defined in claim 1 wherein the two end walls of the capsule are provided with radial stiffening ribs.

8. A transducer as defined in claim 1, wherein the gas contained in the capsule, in the rest condition of the latter, is at atmospheric pressure.

9. A transducer as defined in claim 1, wherein the capsule comprises a single piece of plastics material.

10. A transducer as defined in claim 9, wherein the thickness of the peripheral bellows wall of the capsule is of the order of 0.1–0.2 mm.

11. A transducer as defined in claim 1, wherein the plastics material comprises polyethylene.

12. An instrument fot the measurement of fluid pressure, of the type comprising a support, a graduated scale fixed relative to the support, an indicator movable along the scale relative to the support, a pressure transducer formed by a watertight capsule having a peripheral bellows wall and a pair of opposite end walls, means subjecting the capsule to a fluid pressure, means of attachment of one said end wall to the support, means connecting the other end wall to the indicator to effect displacement of the latter relative to the scale in response to longitudinal expansion and contraction of the capsule due to the variations in the said fluid pressure, wherein the improvement consists in the capsule having a thin bellows wall of flexible plastics material, which capsule is partly filled with gas such as air and also contains an incompressible liquid which is substantially immiscible with said gas, the elasticity of said bellows wall being negligible compared with that of the gas contained within the capsule.

13. An instrument as defined in claim 12 wherein the said liquid is selected from mercury and mineral oils.

14. An instrument as defined in claim 12, including means defining a hole in one of the end walls of the capsule for the introduction and/or removal of liquid, and a removable plug inserted in said hole.

15. An instrument as defined in claim 14, wherein the hole for the introduction and/or the removal of the liquid is an axial hole extending through the said neck.

16. An instrument as defined in claim 12, wherein the means of attachment of said one end wall to the support comprise a neck projecting axially from the center of the respective end wall of the capsule, said neck having a peripheral groove, and a cooperating forked lug forming part of the support and engaging said neck.

17. An instrument as defined in claim 12, wherein the means connecting said other end wall to the indicator comprise a neck projecting axially from the center of the respective end wall of the capsule, said neck having a peripheral groove, and a forked part connected to said indicator device and engaging said neck.

18. An instrument as defined in claim 12, wherein the two end walls of the capsule are provided with radial stiffening ribs.

19. An instrument as defined in claim 12, wherein the gas contained in the capsule, in the rest condition of the latter, is at atmospheric pressure.

20. An instrument as defined in claim 12, wherein the capsule comprises a single piece of plastics material.

21. An instrument as defined in claim 12, wherein the plastics material comprises polyethylene.

22. An instrument as defined in claim 12, wherein the thickness of the peripheral bellows wall of the capsule is of the order of 0.1–0.2 mm.

23. An instrument as defined in claim 12, wherein the support comprises a tubular casing having a transparent part and closed at one end, said pressure subjecting means comprising a port at the said other end of the casing for communication with an environment the pressure of which is to be measured, and wherein the capsule extends coaxially within the tubular casing, the attachment means securing one of the end walls of the capsule to the closed end of the casing, and the connecting means connecting the other end wall of the capsule to the indicator, which is visible from the outside of the casing through said transparent casing part, the latter having a graduated scale extending longitudinally of the tubular casing.

24. An instrument as defined in claim 12, wherein:
(a) the support comprises a rigid fluid-tight tubular casing having a transparent wall and closed at one end, the other end of the casing being provided with a restrictor orifice;
(b) a flexible hood sealed over the other end of the casing and exposed to the external environment, the interior of the hood communicating with the interior of the casing through the said restrictor orifice;
(c) the capsule extends coaxially within the tubular casing and the attachment means secure one of the end walls of the capsule to the closed end of the casing and the connecting means connecting its other end wall of the capsule to the indicator, which is visible from the outside of the casing through the transparent casing wall, the latter having a graduated scale extending longitudinally of the casing, and
(d) the interior of the flexible hood, the restrictor orifice and the interior of the rigid casing around the capsule define a space which is filled with fluid, enabling the instrument to be used as a decompression gauge.

25. An instrument as defined in claim 12, including a fluid-tight casing enclosing the support, the indicator, the pressure transducer, the means of attachment to the support and the means of connecting to the indicator, means for applying to the interior of the casing the pressure of an environment the pressure of which is to be measured, the casing having a transparent wall through which the indicator is visible, and a graduated scale, visible through the transparent wall, provided on said transparent wall of the casing.

26. An instrument as defined in claim 25, wherein:
(a) the support is in the form of a plate fixed in the casing, with a front face turned towards the transparent wall;
(b) the indicator comprises a pointer mounted upon a spindle rotatably mounted on said plate, the pointer being movable over the front face of said plate;
(c) a slidable cursor is mounted on the support plate;

(d) rectilinear guide means are provided on a rear face of the plate, opposite said front face, for guiding displacement of said slidable cursor;
(e) transmission means are provided, interconnecting the cursor and the spindle to transform linear displacements of the cursor into corresponding angular displacements of the spindle and of the pointer; and
(f) the connecting means connect the said other end wall of the capsule to the cursor so that the longitudinal axis of the capsule is parallel to the direction of movement of the cursor.

27. An instrument as defined in claim 26, wherein said transmission means comprise a length of thread the two ends of which are anchored to the cursor, the thread having a portion, extending parallel to the direction of movement of the cursor, and being formed a turn wound around the spindle, and wherein an elastic tensioning element is included in said thread.

28. An instrument as defined in claim 27, wherein the thread is disposed in a U-shaped loop with its two ends anchored to the same end of the cursor, and including a transmission element forming the said loop being formed in the thread and carried by the other end of the cursor, one of the portions of the U-shaped loop being formed with the turn and wound around the spindle of the pointer.

29. An instrument as defined in claim 28, wherein the end of the thread portion opposite that formed with the turn is anchored to the corresponding end of the cursor through the interposition of the said tensioning element, which comprises a helical tension spring.

30. An instrument as defined in claim 28, wherein the transmission element comprises a pulley rotatably mounted on the cursor.

31. An instrument as defined in claim 26, wherein the support plate and the cursor are provided with respective forked lugs in which are engaged respective necks on the end walls of the capsule, constituting the attachment means and the connecting means respectively.

32. An instrument as defined in claim 26, wherein the capsule is disposed in juxtaposition to the cursor.

33. An instrument as defined in claim 26, wherein the capsule is disposed in alignment with the cursor.

34. An instrument as defined in claim 25, wherein the fluidtight casing is completely filled with a liquid in which the capsule and other parts within the casing are immersed and wherein the means for applying the pressure of the environment to the interior of the casing comprise a flexible membrane which forms at least part of one of the walls of the casing, enabling the instrument to be used as a depth gauge.

35. An instrument as defined in claim 34, wherein the casing has a flattened substantially cylindrical shape, one end wall of which is transparent and the other end wall of which is constituted by the said flexible membrane.

* * * * *